United States Patent
Saitou et al.

(10) Patent No.: US 8,014,925 B2
(45) Date of Patent: Sep. 6, 2011

(54) CONTROL APPARATUS FOR AUTOMATIC TRANSMISSION FOR VEHICLE

(75) Inventors: Yoshiharu Saitou, Wako (JP); Ryuji Murata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 845 days.

(21) Appl. No.: 12/018,679

(22) Filed: Jan. 23, 2008

(65) Prior Publication Data

US 2008/0177451 A1 Jul. 24, 2008

(30) Foreign Application Priority Data

Jan. 23, 2007 (JP) ................................ 2007-012827

(51) Int. Cl.
G06F 7/76 (2006.01)
B60K 23/00 (2006.01)

(52) U.S. Cl. ............... 701/55; 701/51; 701/53; 701/56; 701/65; 477/78; 477/97; 477/120; 424/448; 180/337

(58) Field of Classification Search .................... 701/53, 701/56, 58, 65; 477/47, 78, 140; 180/337
See application file for complete search history.

(56) References Cited

U.S. PATENT DOCUMENTS

| | | | |
|---|---|---|---|
| 5,016,495 A | | 5/1991 | Takizawa |
| 5,484,350 A | * | 1/1996 | Ishikawa et al. .............. 477/97 |
| 5,531,654 A | * | 7/1996 | Ishikawa et al. ............. 477/120 |
| 6,199,001 B1 | * | 3/2001 | Ohta et al. ..................... 701/51 |
| 6,797,280 B1 | * | 9/2004 | Minematsu et al. .......... 424/448 |
| 2002/0058568 A1 | | 5/2002 | Ishiguro et al. |
| 2008/0065302 A1 | * | 3/2008 | Roudeau et al. ............... 701/58 |
| 2008/0119327 A1 | * | 5/2008 | Kitaori et al. ................ 477/120 |
| 2009/0018732 A1 | * | 1/2009 | Choby et al. .................... 701/51 |
| 2010/0106383 A1 | * | 4/2010 | Poisson et al. ................. 701/60 |

FOREIGN PATENT DOCUMENTS

| | | |
|---|---|---|
| EP | 0 864 781 A1 | 9/1998 |
| FR | 2 864 601 A1 | 7/2005 |
| FR | 2 870 486 A1 | 11/2005 |
| FR | 2 877 416 A1 | 5/2006 |
| JP | 57-163731 | 10/1982 |
| JP | 2862538 B2 | 4/1989 |
| JP | 2-203071 | 8/1990 |
| JP | 2959938 B2 | 3/1995 |
| JP | 11-108176 | 4/1999 |
| JP | 2003-314682 | 11/2003 |
| WO | WO 2006/112528 A1 | 10/2006 |

* cited by examiner

*Primary Examiner* — Thomas G Black
*Assistant Examiner* — Lin B Olsen
(74) *Attorney, Agent, or Firm* — Arent Fox LLP

(57) ABSTRACT

A control apparatus for an automatic transmission includes an operational condition detecting unit for detecting a vehicle operational condition, a slope detecting unit for detecting a road surface slope, and a shift characteristic selecting unit for selecting one of a plurality of shift maps preliminarily set according to the road surface slope. The control apparatus further includes an acceleration/deceleration calculating unit for calculating an acceleration or deceleration from the degree of increase or decrease in vehicle speed per unit time, a deceleration shift characteristic for deciding a gear position according to the deceleration and the vehicle speed, and a brake detecting unit for detecting a brake operation. When the road surface slope is determined to be a downhill slope and the brake operation is detected, the selected shift map is changed to the deceleration shift characteristic and the gear position is decided according to the deceleration shift characteristic.

7 Claims, 15 Drawing Sheets

EXPECTED ACCELERATION MAP

CONTROL APPARATUS FOR AUTOMATIC TRANSMISSION FOR VEHICLE

BACKGROUND OF THE INVENTION

1. Field of the Invention

The present invention relates to a control apparatus for an automatic transmission for a vehicle, and more particularly to a downhill brake downshift control apparatus for an automatic transmission for a vehicle.

2. Description of the Related Art

Various control apparatuses for an automatic transmission for a vehicle have been proposed. In general, a plurality of kinds of shift maps for providing various shift characteristics are prepared, and a value indicative of a running resistance is obtained from an acceleration. Then, it is determined whether the vehicle running road is a level road, an uphill road, or a downhill road according to the value indicative of the running resistance, and any one of the plural shift maps is selected according to the kind of the vehicle running road determined above. Then, a gear position is controlled according to the selected shift map. In other words, an expected acceleration preliminarily set according to an engine output is compared with an actual acceleration obtained in actual, and the slope of a road surface on which the vehicle is running is determined from the result of this comparison. Then, an optimum shift map is selected according to the road surface slope determined above, and a gear position is decided according to the selected shift map.

For example, Japanese Patent No. 2959938 discloses a control apparatus for an automatic transmission for a vehicle such that forcible downshift in running of a vehicle on a downhill road is suppressed more as the road surface slope becomes greater unless the driver's intention to decelerate the vehicle is strong, thus improving the drivability. Further, Japanese Patent No. 2862538 discloses a control apparatus for an automatic transmission such that when the road surface slope is detected to be a downhill slope greater than a predetermined value, a brake operation is detected, and a deceleration greater than a predetermined value is detected, the normal shift characteristic is changed to a shift characteristic such that a shift line in a low load condition is shifted to a higher vehicle speed, thereby preventing troublesome shift due to an accelerator operation.

In such a conventional control apparatus for an automatic transmission, a downshift vehicle speed is changed by changing the shift map to a shift map for a downhill road, and it is determined whether or not downshift is to be performed according to the downshift vehicle speed changed above. Accordingly, there is a case that desired downshift is not performed. Specifically, there is a problem such that downshift occurs with a delay from a brake operation, that a plurality of steps of downshift occur against the driver's intention, or that downshift does not occur in a high deceleration region where downshift is to be performed.

SUMMARY OF THE INVENTION

It is therefore an object of the present invention to provide a control apparatus for an automatic transmission for a vehicle which can reduce the frequency of unexpected downshift and upshift to thereby allow smooth driving on a downhill road and a shift operation according to the driver's intention.

In accordance with an aspect of the present invention, there is provided a control apparatus for an automatic transmission for a vehicle, including: operational condition detecting means for detecting a vehicle operational condition including at least a vehicle speed and an engine load; slope detecting means for detecting a road surface slope; shift characteristic selecting means for selecting one of a plurality of shift characteristics preliminarily set according to the road surface slope; acceleration/deceleration calculating means for calculating an acceleration or deceleration from the degree of increase or decrease in vehicle speed per unit time; a deceleration shift characteristic for deciding a gear position according to the deceleration and the vehicle speed; and brake detecting means for detecting a brake operation; wherein when the road surface slope is determined to be a downhill slope by the slope detecting means and the brake operation is detected by the brake detecting means, the selected shift characteristic is changed to the deceleration shift characteristic and the gear position is decided according to the deceleration shift characteristic.

With this configuration, the frequency of unexpected downshift and upshift can be reduced to thereby allow smooth driving on a downhill road and a shift operation according to the driver's intention. Further, it is unnecessary to set a deceleration shift map, so that the man-hour for development can be reduced. In particular, it is possible to prevent the complication of verification due to an increase in number of gear positions and combinations thereof.

Preferably, the control apparatus further includes corrected deceleration calculating means for calculating a corrected deceleration by multiplying the calculated deceleration by a correction coefficient according to the downhill slope; wherein the gear position is decided according to the corrected deceleration and the vehicle speed by the deceleration shift characteristic.

With this configuration, the corrected deceleration according to the downhill slope is calculated, and the gear position is decided according to this corrected deceleration and the vehicle speed. Accordingly, the deceleration shift characteristic can suitably cover a wide range of downhill slopes from a light downhill road to a double heavy downhill road, thereby allowing a shift operation according to the driver's intention over a wide range of downhill slope.

Preferably, the control apparatus further includes deceleration limit value calculating means for calculating a deceleration limit value according to the downhill slope; and corrected deceleration limiting means for limiting the corrected deceleration to the deceleration limit value when the corrected deceleration becomes greater than the deceleration limit value.

With this configuration, the corrected deceleration is limited to the deceleration limit value. Accordingly, when the deceleration is large, downshift can be delayed to thereby prevent a shock due to too early downshift.

Preferably, the control apparatus further includes target gear position calculating means for calculating a brake downshift control target gear position according to the vehicle speed and the corrected deceleration; downshift end detecting means for detecting the end of downshift; and downshift execution determining means for determining the execution of downshift by comparing the target gear position and the present gear position at the time of ending of downshift.

With this configuration, the execution of downshift is determined by comparing the target gear position and the present gear position at the time of ending of downshift. Accordingly, brake downshift can be executed stepwise, thereby reducing delayed downshift occurring after rapid deceleration in a short time.

Preferably, the control apparatus further includes kickup acceleration threshold setting means for setting a kickup determination acceleration threshold according to the downhill slope for each gear position; and kickup permitting means for permitting kickup when the acceleration becomes greater than the kickup determination acceleration threshold by the depression of an accelerator pedal.

With this configuration, when the accelerator pedal is largely depressed to cause a large acceleration, kickup is permitted to thereby cancel the downhill brake downshift control. Accordingly, a smooth decelerating operation according to the driver's intention can be performed.

Preferably, the control apparatus further includes upshift deceleration threshold setting means for setting a downshift canceling and upshift determination deceleration threshold for each gear position; and downshift canceling and upshift permitting means for permitting upshift when the deceleration becomes greater than the downshift canceling and upshift determination deceleration threshold in the condition where an accelerator pedal is undepressed and a brake pedal is undepressed.

With this configuration, when the deceleration is large during coasting in the condition where the accelerator pedal is undepressed and the brake pedal is undepressed, the downhill brake downshift control is canceled. Accordingly, a shift operation according to the driver's intention can be performed to improve the drivability.

Preferably, the control apparatus further includes downhill upshift limit vehicle speed setting means for setting a downhill upshift limit vehicle speed according to the downhill slope for each gear position; and upshift permission changing means for changing a lowest upshift vehicle speed of the selected shift characteristic into the downhill upshift limit vehicle speed at start and acceleration by the depression of an accelerator pedal.

With this configuration, at start and acceleration on a downhill road, the lowest upshift vehicle speed is shifted to a higher vehicle speed according to the downhill slope, thereby limiting unnecessary upshift to improve the drivability.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
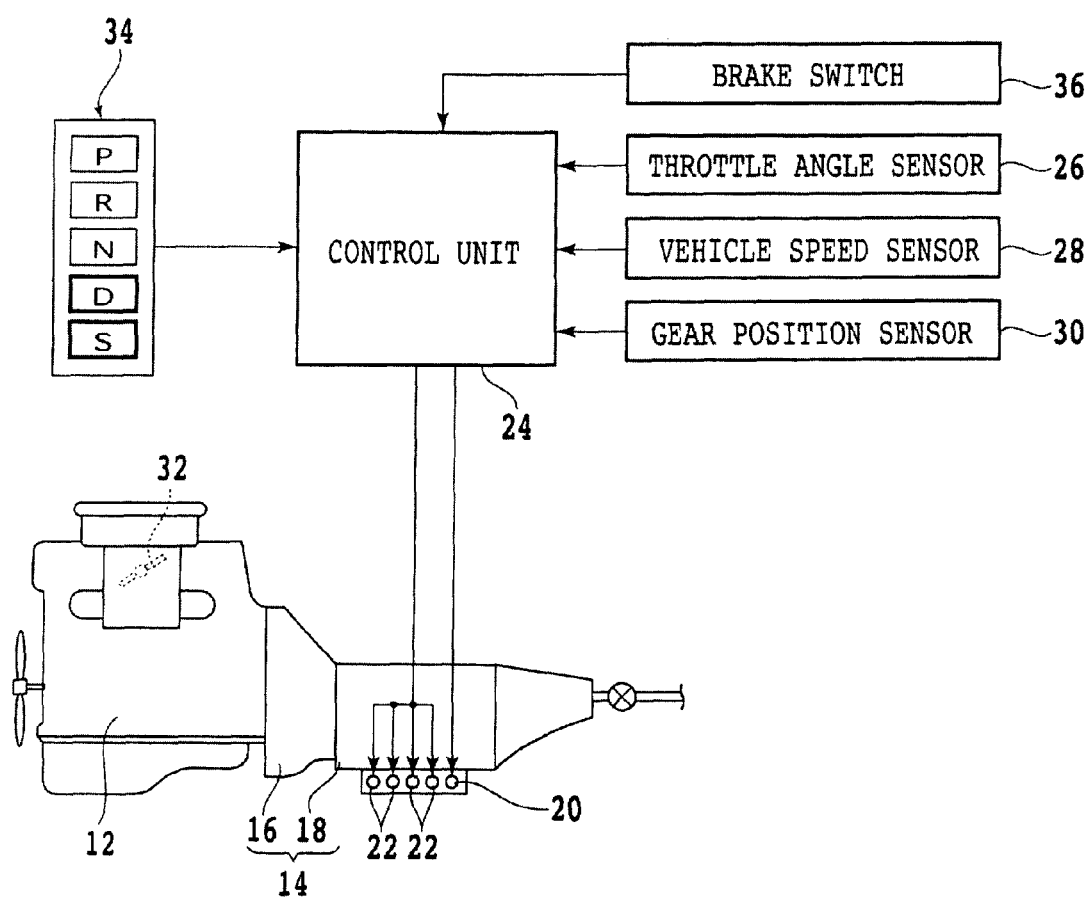
FIG. 1 is a schematic diagram showing a general configuration of a control apparatus for an automatic transmission according to a preferred embodiment of the present invention.

FIG. 1 is a schematic diagram showing a general configuration of a control apparatus for an automatic transmission for a vehicle according to the present invention. In FIG. 1, reference numerals 12 and 14 denote an engine and an automatic transmission, respectively. An output from the engine 12 is transmitted through the automatic transmission 14 to drive wheels (not shown). The automatic transmission 14 is composed of a torque converter 16 and a multispeed change gear drive 18. The torque converter 16 is provided with a lockup clutch (not shown). The lockup clutch is engaged or disengaged by controlling a solenoid 20 for lockup.

The multispeed change gear drive 18 has six gear positions for forward running, and as well known in the art a desired one of these gear positions can be set by changing the combination of energization and de-energization of a plurality of solenoids 22 for gear shift as shift operating means. Each of these solenoids 20 and 22 functions to switch the operational modes of a hydraulic actuator for lockup or gear shift. Reference numeral 24 denotes a control unit (ECU) using a microcomputer, and signals from a throttle angle sensor 26, a vehicle speed sensor 28, and a gear position sensor 30 are input into the control unit 24. The throttle angle sensor 26 functions to detect an opening angle of a throttle valve 32, i.e., a throttle angle. The vehicle speed sensor 28 functions to detect a present vehicle speed, and the gear position sensor 30 functions to detect a present gear position in the automatic transmission 14.

Reference numeral 34 denotes a shift position of a shift lever. As well known, P, R, and N denote a parking range, a reverse range, and a neutral range, respectively. Further, D denotes a drive range, wherein when the shift lever is in the drive range (D range), the shift mode becomes an automatic shift mode where a gear position or gear ratio to be set is determined according to a vehicle running condition. On the other hand, S denotes a sport range or manual shift range where manual-like running can be obtained in the automatic transmission.

Further, a selected range in the shift lever position 34 is input into the control unit 24, and a signal from a brake switch 36 for detecting the operation of a brake is also input into the control unit 24. The control unit 24 outputs an on/off control signal to the solenoid 20 for the lockup clutch and a shift control signal to each solenoid 22. The control unit 24 basically includes a CPU, ROM, RAM, and clock (soft timer), and further includes an A/D converter or D/A converter and an input/output interface. Such a configuration is well known in the case of using a microcomputer, so the description thereof will be omitted herein.

Figure 2:
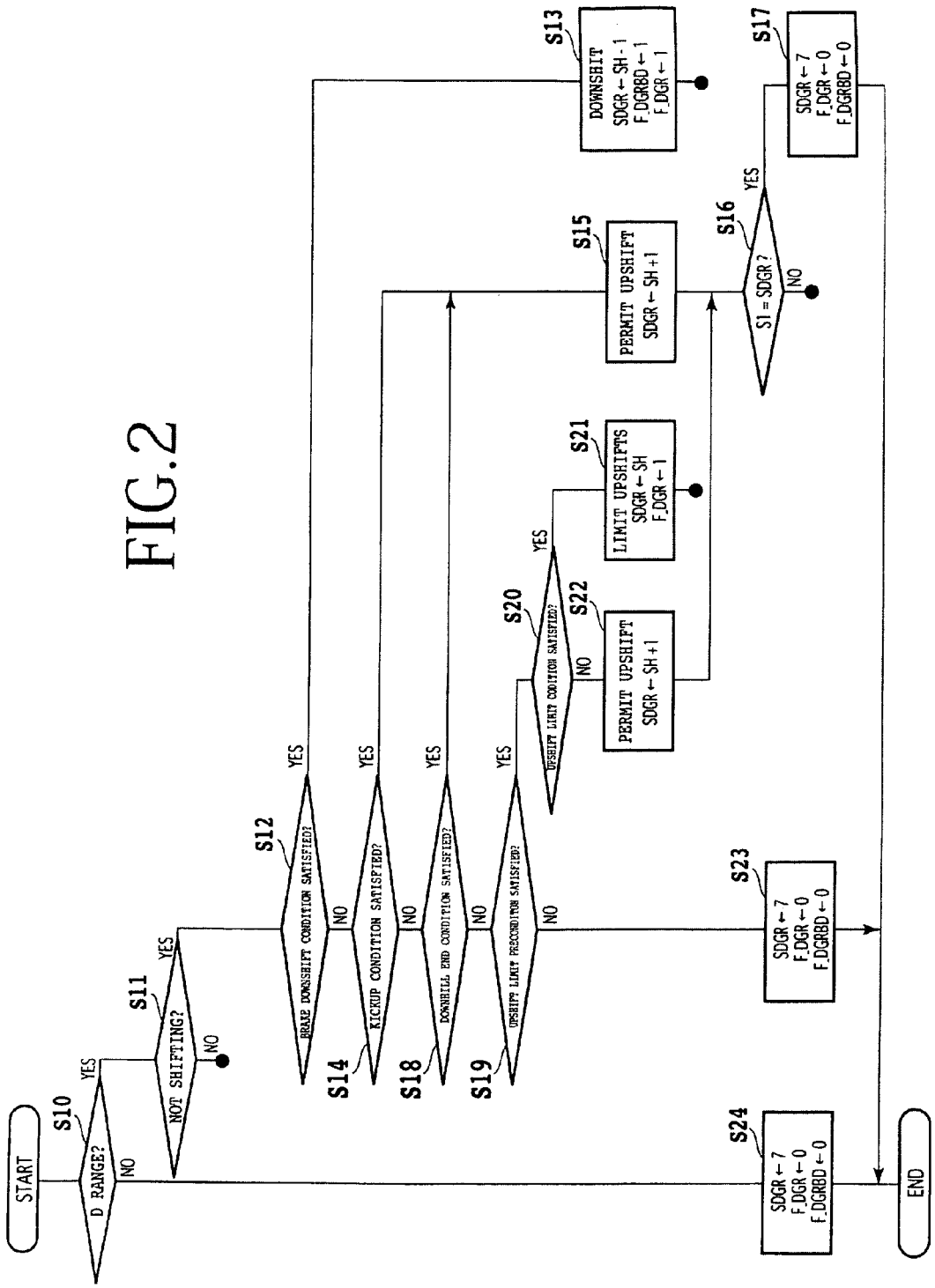
FIG. 2 is a flowchart showing the control sequence of the downhill brake downshift control according to the present invention.

The control sequence of the downhill brake downshift control according to the present invention will now be described with reference to the flowchart shown in FIG. 2. In step S10, it is determined whether or not the shift range is the D range.

If the answer in step S10 is affirmative, the program proceeds to step S11 to determine whether or not the transmission is not shifting. If the answer in step S1 is negative, i.e., if the transmission is shifting, this program is not executed, but returned to any other subroutine.

If the answer in step S11 is affirmative, i.e., if the transmission is not shifting, the program proceeds to step S12 to determine whether or not a brake downshift condition is satisfied, i.e., whether or not DTV2L<DTVBD (SH, V), where DTV2L=MAX (DTV2MIN, DTV2), which means that any larger one of DTV2MIN and DTV2 is adopted. DTV2 stands for a corrected deceleration, and DTV2=DTV×KDTV2, where DTV stands for the degree of increase or decrease in vehicle speed per unit time, i.e., it stands for an acceleration in the case of taking on positive values or a deceleration in the case of taking on negative values. KDTV2 stands for a correction coefficient according to the slope of a downhill road. DTV2MIN stands for a limit value of DTV2. The brake downshift condition in step S12 will be hereinafter described in more detail with reference to the shift maps shown in FIGS. 9A to 11.

If the answer in step S12 is affirmative, the program proceeds to step S13 to substitute SH−1 obtained by subtracting a present gear position SH by one for a brake downshift control target gear position SDGR, to set a downshift command flag F_DGRBD, to set a downshift control flag F_DGR, and to perform downshift. If the answer in step S12 is negative, the program proceeds to step S14 to determine whether or not a kickup condition is satisfied, i.e., whether or not DTV>DTVKUP (SH, PKU), where DTVKUP (SH, PKU) stands for a kickup determination DTV threshold.

Figure 14:
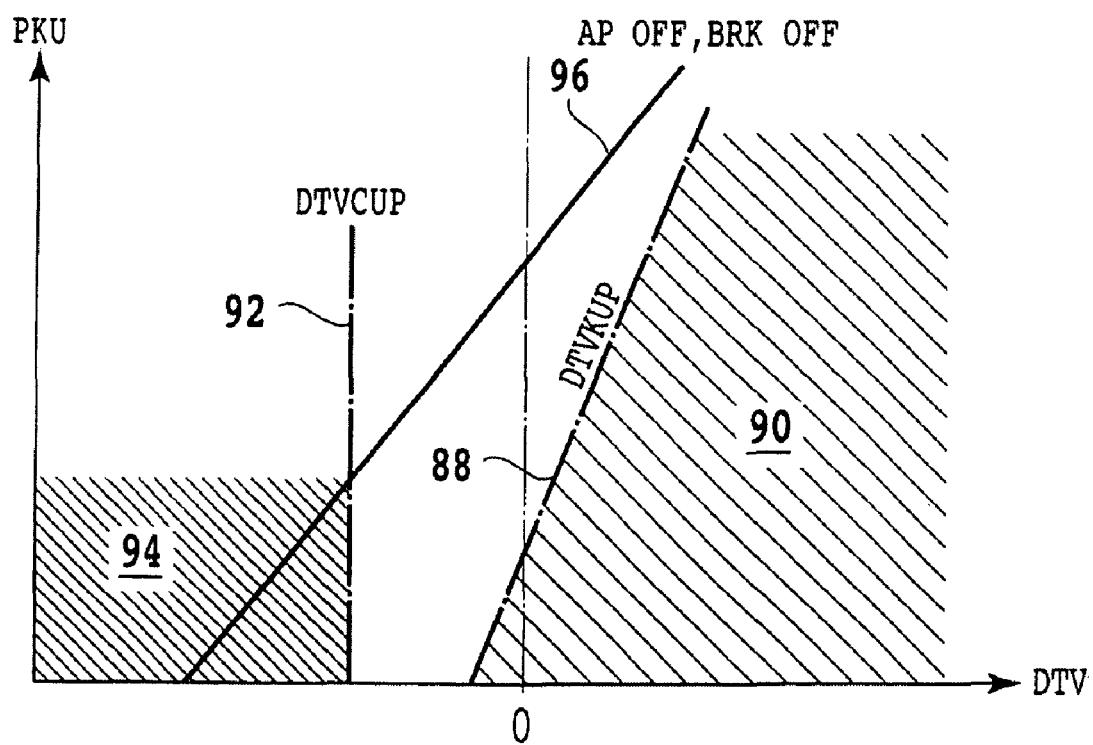
FIG. 14 is a graph for illustrating the control of cancellation of downhill brake downshift.

The kickup condition in step S14 will be hereinafter described in more detail with reference to FIG. 14. If the answer in step S14 is affirmative, the program proceeds to step S15 to substitute SH+1 for the brake downshift control target gear position SDGR and to permit upshift. The program next proceeds to step S16 to determine whether or not the lowest gear position S1 attainable on the shift map is the same as the target gear position SDGR. If the answer in step S16 is affirmative, the program proceeds to step S17 to substitute 7 for the target gear position SDGR, to reset the downshift control flag F_DGR, and to reset the downshift command flag F_DGRBD. Then, this program is ended.

The reason for substitution of 7 for the target gear position SDGR in step S17 is that the automatic transmission in this preferred embodiment has six gear positions for forward running and this program is ended by substituting a suitable integer greater than 6 for the target gear position SDGR. If the answer in step S16 is negative, this program is returned to any other subroutine. If the answer in step S14 is negative, the program proceeds to step S18 to determine whether or not a downhill end condition is satisfied, i.e., whether or not DTV<DTVCUP (SH, V), where DTVCUP (SH, V) stands for a downshift canceling and upshift determination DTV threshold. The downhill end condition in step S18 will be hereinafter described in more detail with reference to FIG. 14.

If the answer in step S18 is affirmative, the program proceeds to step S15 to substitute SH+1 for the target gear position SDGR and to permit upshift. Thereafter, the steps S16 and S17 are executed. If the answer in step S18 is negative, the program proceeds to step S19 to determine whether or not an upshift limit precondition is satisfied, i.e., whether or not S1>SH and SH<6, where S1 is the lowest gear position attainable on the shift map and SH is the present gear position.

If the answer in step S19 is affirmative, the program proceeds to step S20 to determine whether or not an upshift limit condition is satisfied, i.e., whether or not V>VKUPH (SH, PKU), where VKUPH (SH, PKU) stands for a downhill upshift limit vehicle speed and PKU stands for an estimated downhill slope. The upshift limit condition in step S20 will be hereinafter described in more detail with reference to FIGS. 15A and 15B.

If the answer in step S20 is affirmative, the program proceeds to step S21 to substitute the present gear position SH for the target gear position SDGR, to set the downshift control flag F_DGR, and to limit upshift. If the answer in step S20 is negative, the program proceeds to step S22 to substitute SH+1 for the target gear position SDGR and to permit upshift. Then, the program proceeds to step S16 to determine whether or not S1=SDGR. If the answer in step S16 is affirmative, the processing of step S17 is executed.

If the answer in step S19 is negative, the program proceeds to step S23 to substitute 7 for the target gear position SDGR, to reset the downshift control flag F_DGR, and to reset the downshift command flag F_DGRBD. Then, this program is ended. If the answer in step S10 is negative, i.e., if the shift range is any one of the P, R, N, and S ranges, the brake downshift condition for the control of the present invention is not satisfied, so that the program proceeds to step S24 to substitute 7 for the target gear position SDGR, to reset the downshift control flag F_DGR, and to reset the downshift command flag F_DGRBD. Then, this program is ended.

Figure 3:
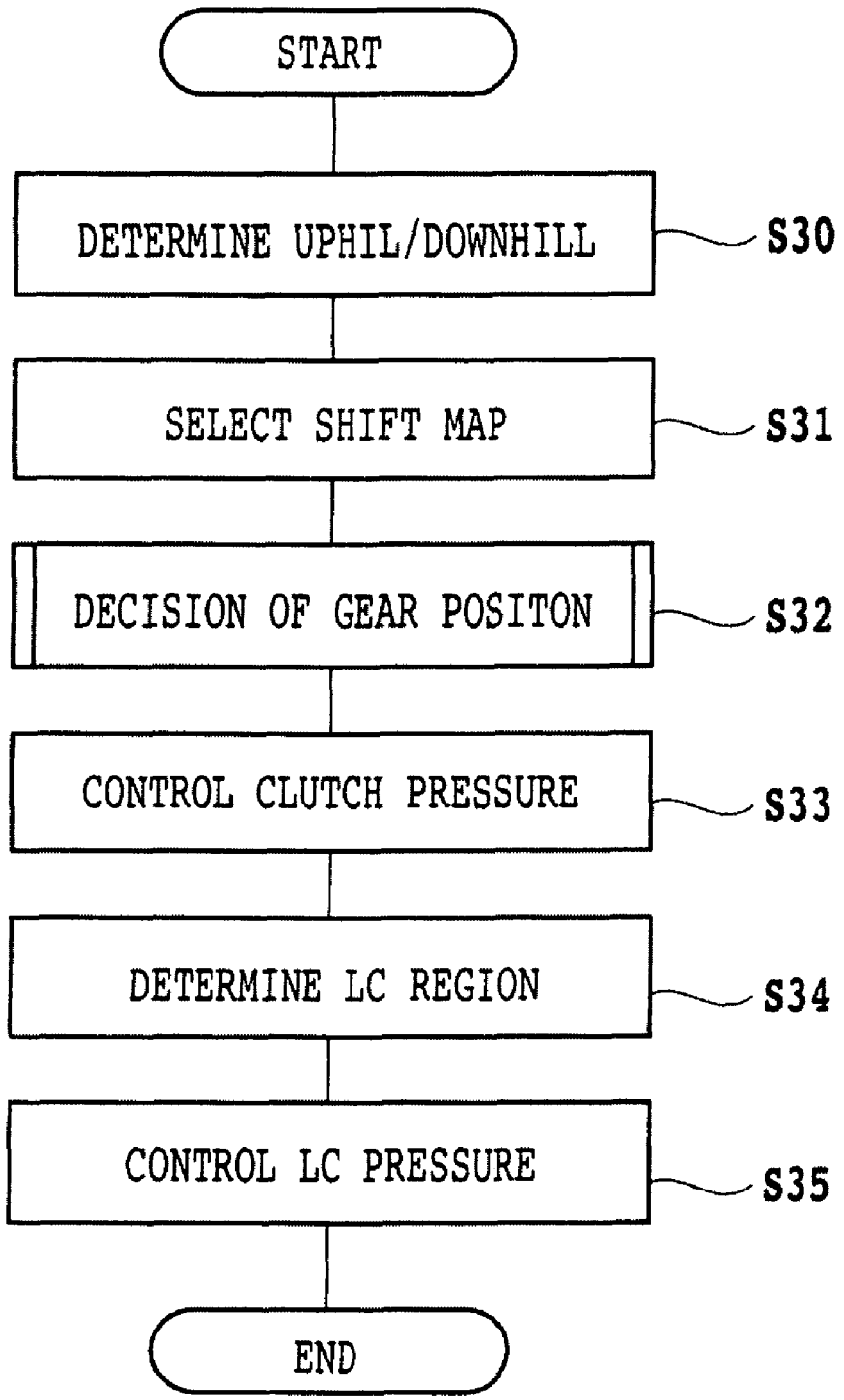
FIG. 3 is a flowchart showing the shift control processing including the downhill brake downshift control according to the present invention.
Figure 4:
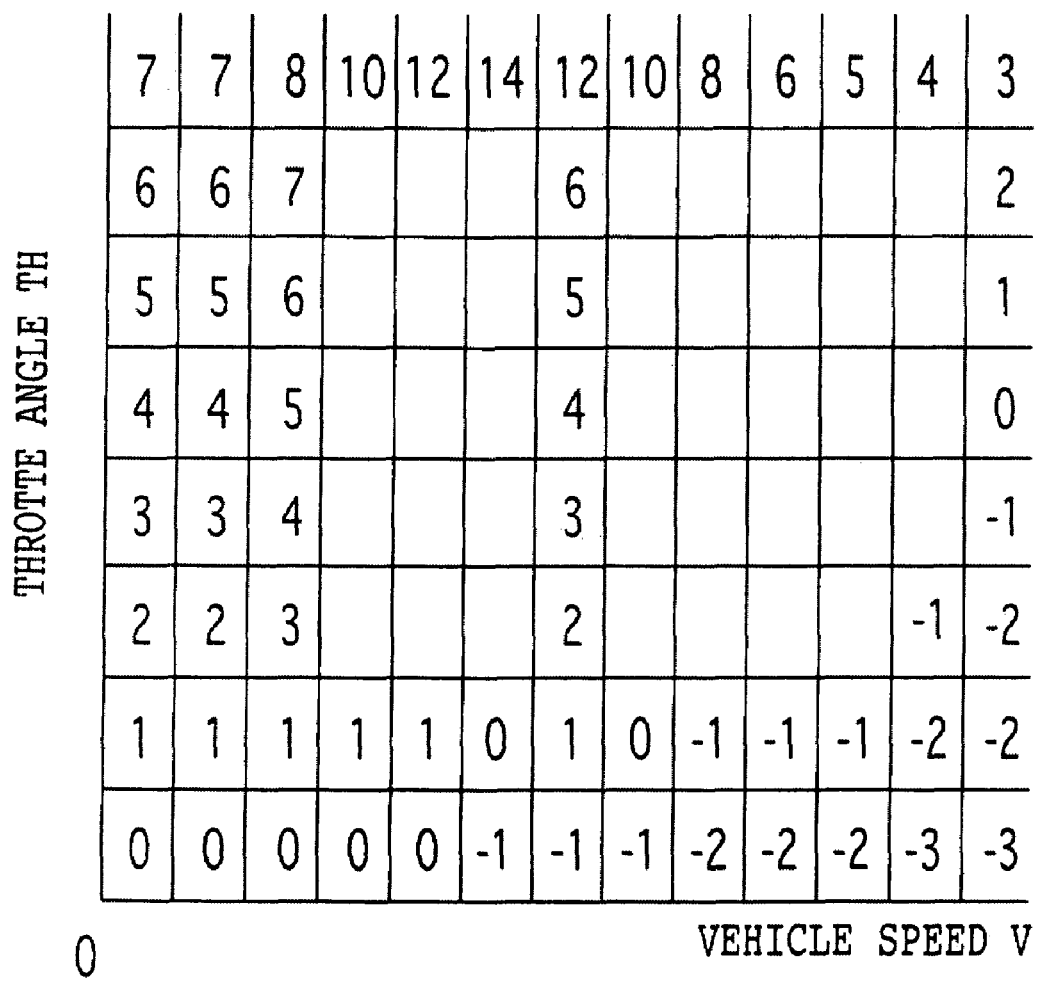
FIG. 4 is an expected acceleration map.

The gear position decision sequence in the downhill brake downshift control according to the present invention will now be described with reference to the flowchart shown in FIG. 3. In step S30, uphill/downhill determination is executed. More specifically, an expected acceleration of the vehicle is calculated according to a vehicle speed and an engine load (throttle angle) to store an expected acceleration map in the memory of the ECU 24. For example, the expected acceleration map is configured as shown in FIG. 4, and it is preliminarily stored in the ROM of the ECU 24. The reason for calculation of the expected acceleration according to a vehicle speed and an engine load is that if the vehicle speed, gear position, and road surface slope are not changed, a drive force, or acceleration changes according to an engine load, and a running resistance, especially, an air resistance is proportional to the square of the vehicle speed.

An actual acceleration or deceleration is obtained from the degree of increase or decrease in vehicle speed per unit time, and this actual acceleration is compared with the expected acceleration calculated above. When the actual acceleration is almost equal to the expected acceleration, it is determined that the vehicle is running on a level road. When the actual acceleration is greater than the expected acceleration, it is determined that the vehicle is running on a downhill road. When the actual acceleration is less than the expected acceleration, it is determined that the vehicle is running on an uphill road. The details of this uphill/downhill determination are disclosed in Japanese Patent No. 2959938 mentioned above. In this manner, the determination of whether the vehicle running road is an uphill road, a downhill road, or a level road can be made by comparing the expected acceleration and the actual acceleration without the use of an inclination sensor.

Figure 5:
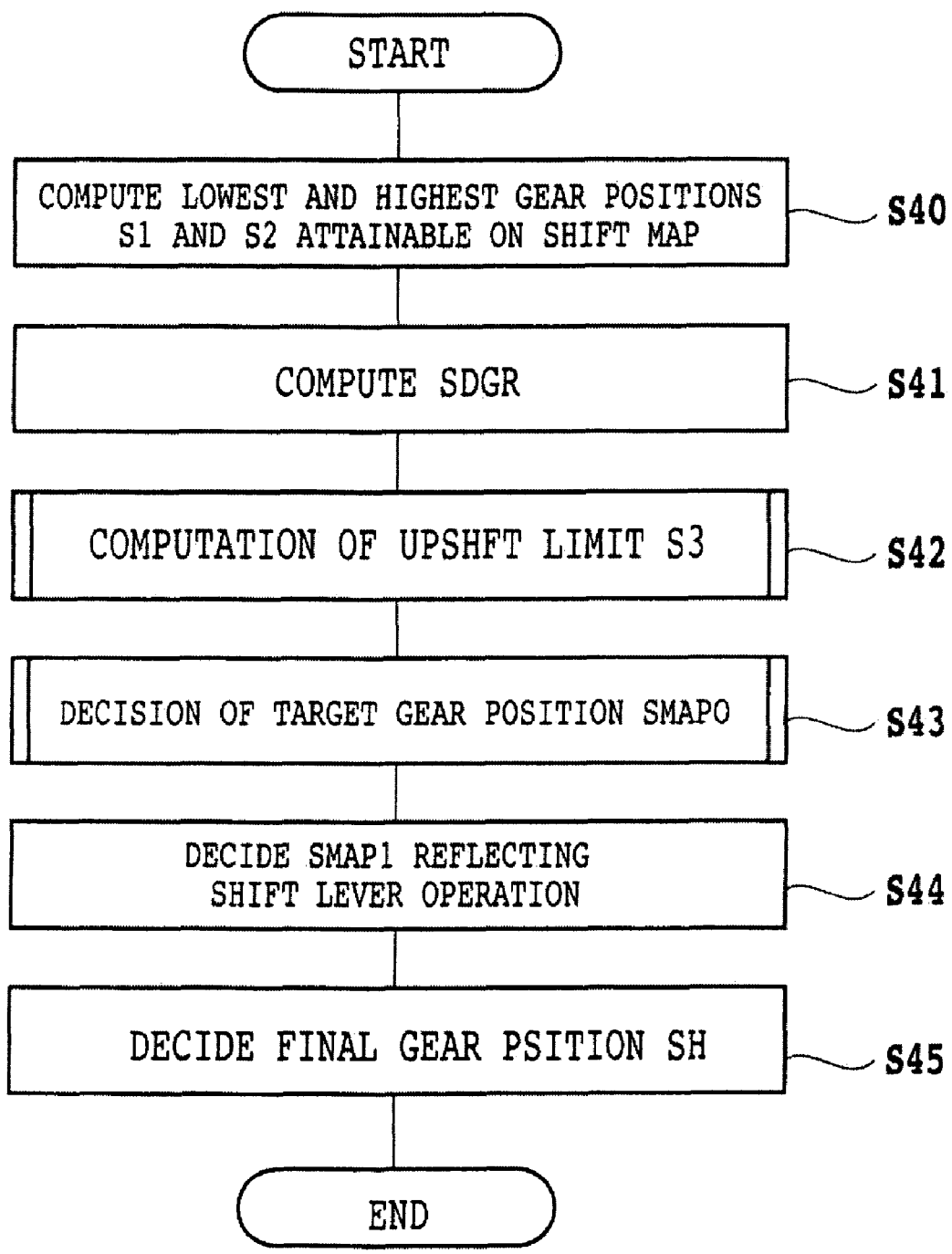
FIG. 5 is a flowchart showing a gear position decision sequence.

After executing the uphill/downhill determination in step S30, the program proceeds to step S31 to select a shift map suitable for the vehicle running road from a plurality of shift maps. In the brake downshift control according to the present invention, it is not necessary in principle to use any shift maps for a downhill road. Accordingly, any one of four kinds of shift maps may be used (e.g., for a level road, a light uphill road, a heavy uphill road, and a double heavy uphill road). However, the use of any shift maps for a downhill road is not hindered in the present invention. The program next proceeds to step S32 to decide a gear position. The details of the gear position decision processing of step S32 are shown in the flowchart of FIG. 5. In step S40 in the flowchart of FIG. 5, the lowest and highest gear positions Si and S2 attainable on the shift map are computed.

Figure 6:
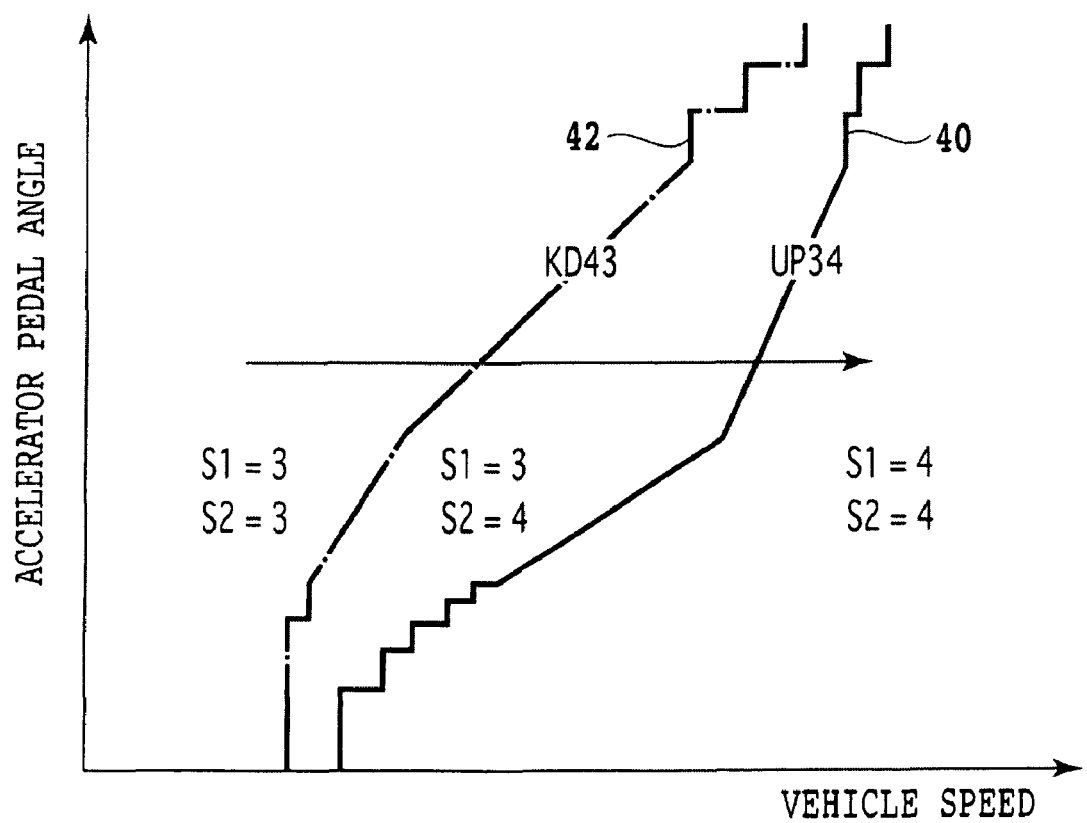
FIG. 6 is a graph for illustrating a lowest gear position S1 and a highest gear position S2 attainable on the shift map.

The lowest and highest gear positions S1 and S2 will now be described with reference to FIG. 6. In FIG. 6, reference numeral 40 denotes a 3-4 upshift line, and reference numeral 42 denotes a 4-3 downshift line. The expression of S1=3 means that the lowest gear position attainable on the shift map is a third gear position, and the expression of S1=4 means that the lowest gear position attainable on the shift map is a fourth gear position. The expression of S2=3 means that the highest gear position attainable on the shift map is a third gear position, and the expression of S2=4 means that the highest gear position attainable on the shift map is a fourth gear position. Accordingly, when the vehicle speed is increased so as to pass through the 3-4 upshift line 40 in upshifting, the lowest gear position is set to S1=4, whereas when the vehicle speed is decreased so as to pass through the 4-3 downshift line 42 in downshifting, the highest gear position is set to S2=3.

Referring again to FIG. 5, the program proceeds to step S41 after computing S1 and S2 in step S40. In step S41, the brake downshift control target gear position SDGR is computed. In the case of downshifting, SH−1 is substituted for the target gear position SDGR. In the case of permitting upshift, SH+1 is substituted for the target gear position SDGR. In the case of limiting upshift, the present gear position SH is substituted for the target gear position SDGR. The program next proceeds to step S42 to compute an upshift limit S3.

Figure 7:
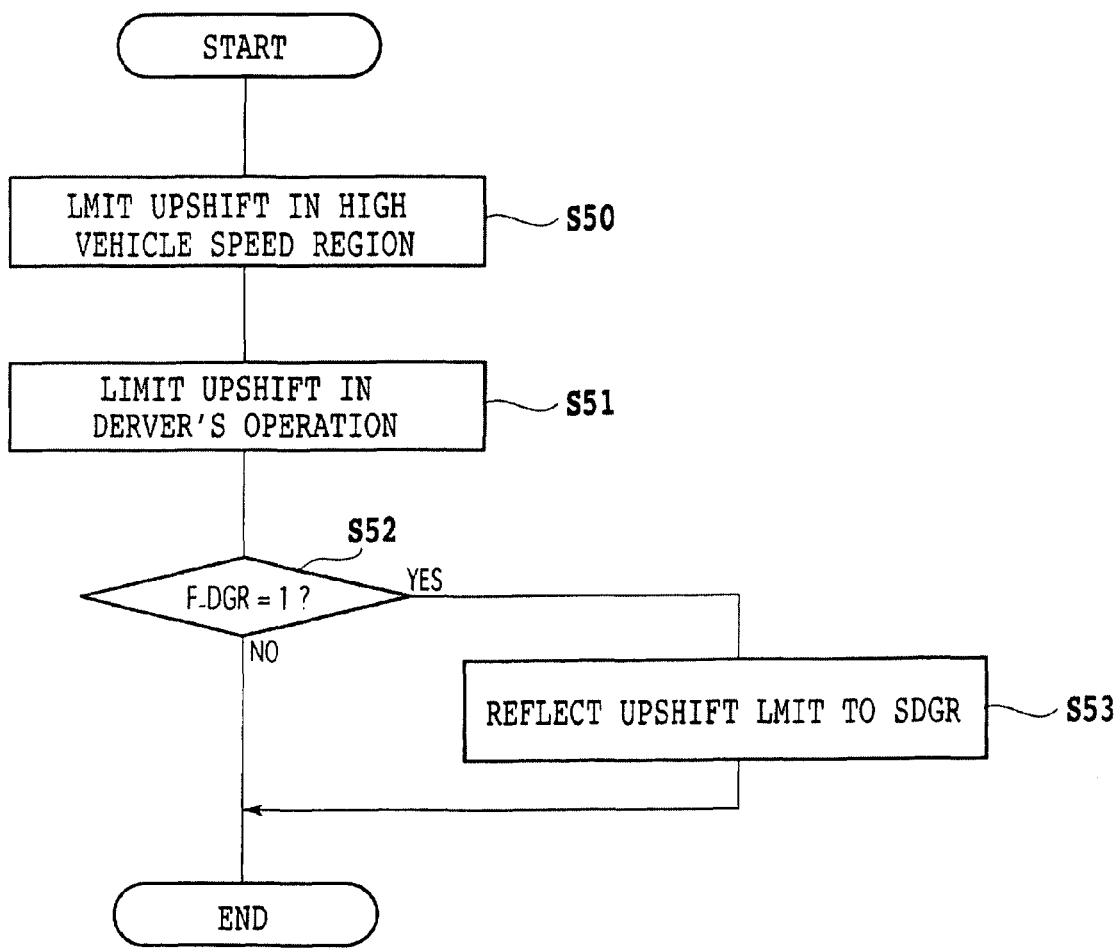
FIG. 7 is a flowchart showing an upshift limit S3.

The upshift limit S3 will now be described with reference to the flowchart shown in FIG. 7. In step S50, upshift is limited in a high vehicle speed region where there is no room in drive force. The program next proceeds to step S51 to limit upshift in the case of accelerated or decelerated running by a driver's operation. The program next proceeds to step S52 to determine whether or not the brake downshift control is being performed. If the answer in step S52 is affirmative, the program proceeds to step S53 to reflect the upshift limit to the brake downshift control target gear position SDGR.

Figure 8:
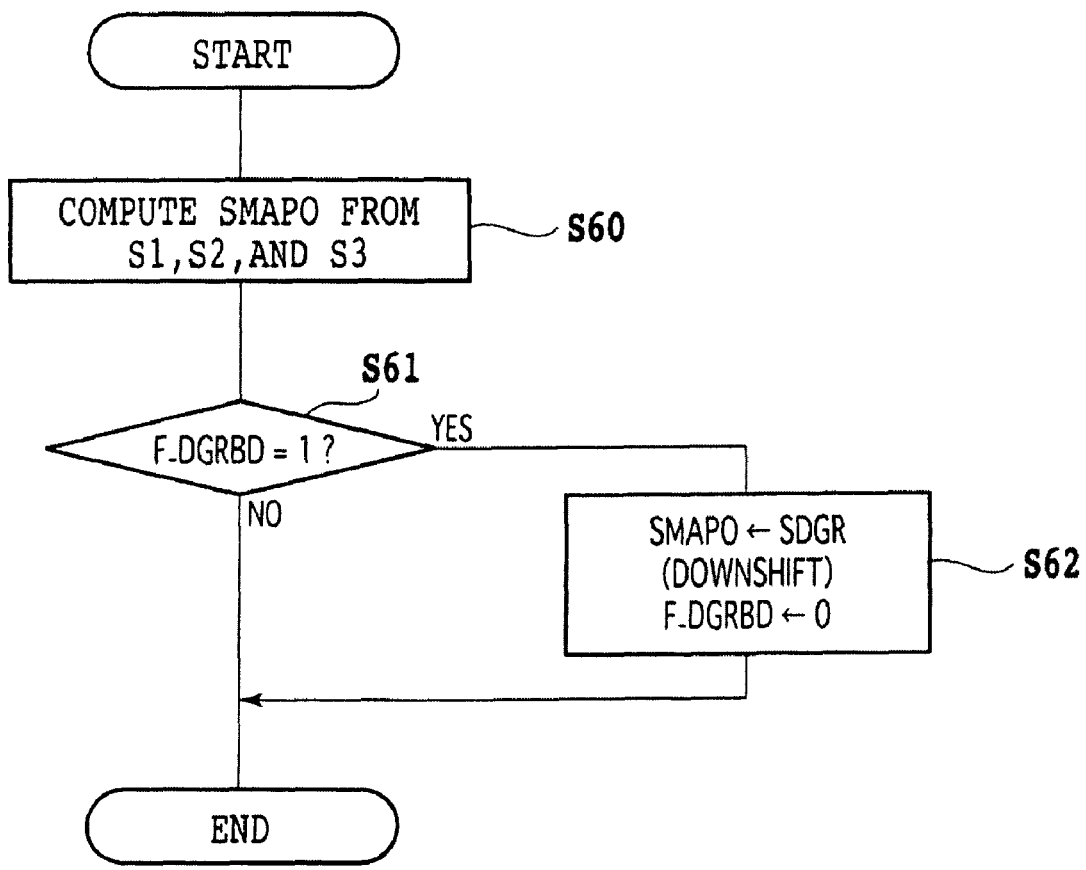
FIG. 8 is a flowchart showing the processing of deciding a target gear position SMAP0.

Referring again to FIG. 5, the program proceeds to step S43 after computing the upshift limit S3 in step S42. In step S43, a target gear position SMAP0 is decided. The sequence of decision of the target gear position SMAP0 in step S43 will now be described with reference to the flowchart shown in FIG. 8. In step S60, the target gear position SMAP0 is computed from the lowest gear position S1, the highest gear position S2, and the upshift limit S3. The program next proceeds to step S61 to determine whether or not the downshift command flag F_DGRBD is one. If the answer in step S61 is affirmative, the program proceeds to step S62 to substitute the brake downshift control target gear position SDGR for the target gear position SMAP0 and to reset the downshift command flag F_DGRBD to zero.

Referring again to FIG. 5, the program proceeds to step S44 after deciding the target gear position SMAP0 in step S43. In step S44, a target gear position SMAP1 reflecting a shift lever operation is decided. In the case that the shift lever is in the D range, SMAP0 and SMAP1 are equal to each other. In the case that the shift lever is in the S range or in the case that the shift lever is in the 2 range or L range, there is a case that SMAP0 and SMAP1 are different from each other. Finally, the program proceeds to step S45 to decide a final gear position SH.

Referring again to FIG. 3, the program proceeds to step S33 after deciding the final gear position SH in step S32. In step S33, a clutch pressure for the final gear position is controlled to establish the final gear position. The program next proceeds to step S34 to determine whether or not the transmission is in a lockup allowed region determined by a throttle angle and a vehicle speed. If the transmission is in the lockup allowed region, the program proceeds to step S35 to engage the lockup clutch or to perform the slip control thereof.

Figure 9A:
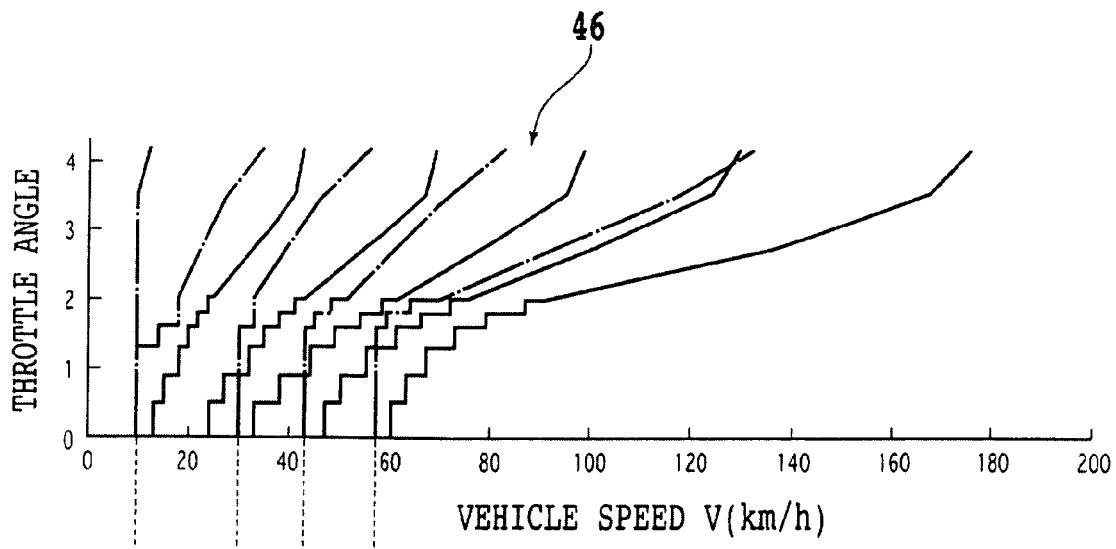
FIG. 9A is a shift map for a level road.
Figure 9B:
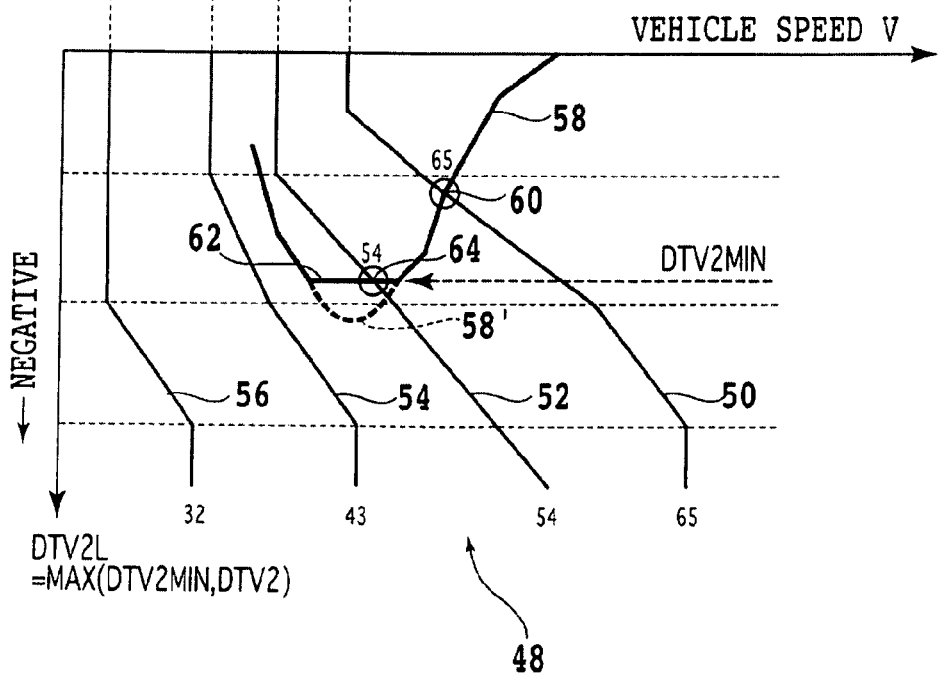
FIG. 9B is a deceleration shift characteristic map.

The brake downshift by the determination of a deceleration (DTV) according to the present invention will now be described with reference to FIGS. 9A and 9B. FIG. 9A is a level road shift map 46 for a six-speed automatic transmission, wherein the solid lines show upshift lines and the dot & dash lines show downshift lines. As well known in the art, hysteresis is provided between the upshift lines and the downshift lines, so as to prevent shift hunting. FIG. 9B is a deceleration shift characteristic map 48 according to a deceleration and a vehicle speed, which map is characteristic of the present invention. In FIG. 9B, the horizontal axis represents vehicle speed V, and the vertical axis represents DTV2L, where DTV2L=FIAX (DTV2MIN, DTV2), which means that any larger one of DTV2MIN and DTV2 is adopted.

Figure 10:
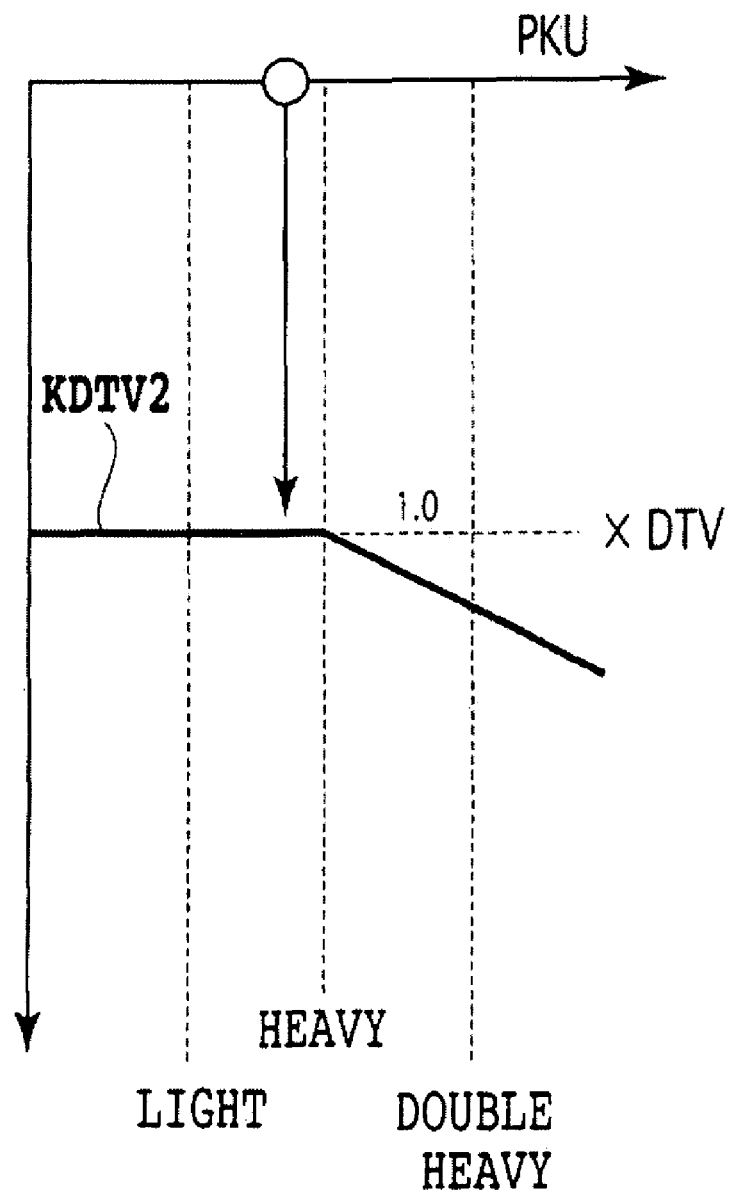
FIG. 10 is a graph showing a correction coefficient KDTV2 according to a downhill slope PKU.
Figure 11:
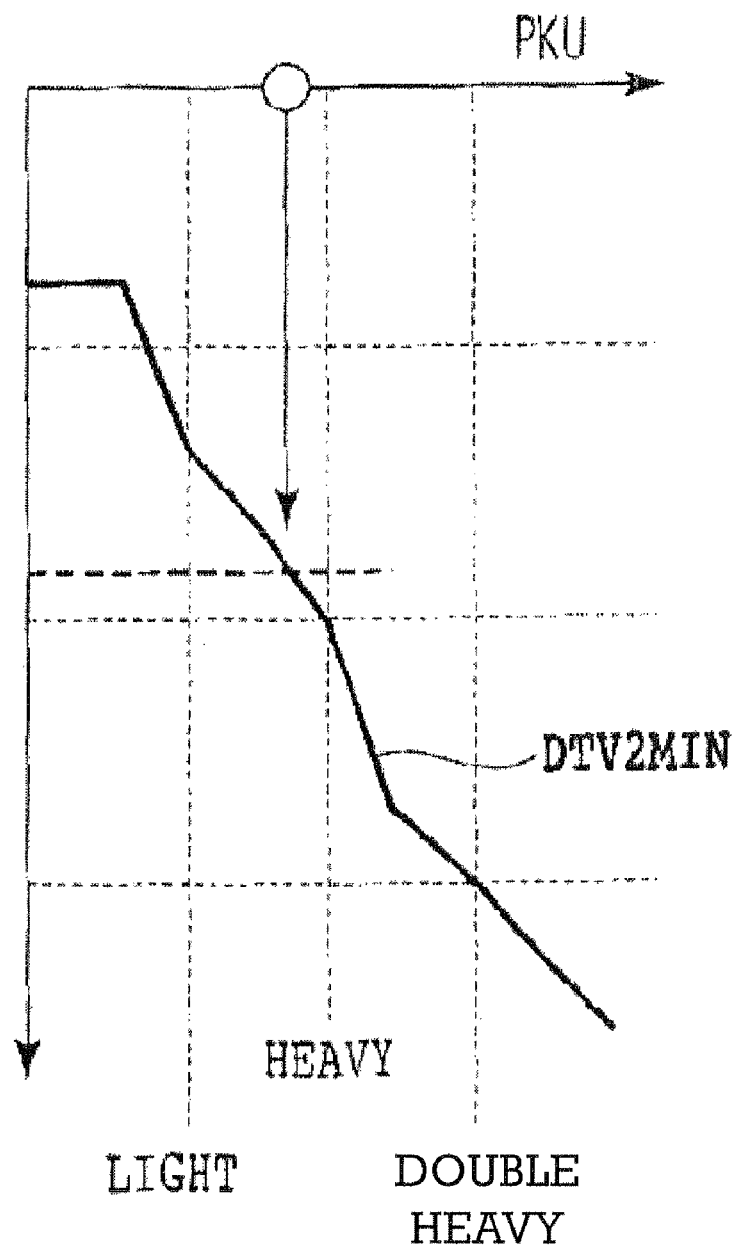
FIG. 11 is a graph showing a corrected deceleration limit value DTV2MIN according to a downhill slope PKU.

DTV2 is the corrected acceleration, which can be obtained from the expression of DTV2=DTV×KDTV2, where KDTV2 is the correction coefficient according to the downhill slope PKU. For example, as shown in FIG. 10, KDTV2 is set equal to 1.0 in the case of a light downhill road and a heavy downhill road, and KDTV2 is set larger than 1.0 in the case of a double heavy downhill road. Further, DTV is the acceleration or deceleration. That is, DTV is the acceleration in the case of taking on positive values, whereas DTV is the deceleration in the case of taking on negative values. Further, DPV2MIN is the deceleration limit value (lower limit). As shown in FIG. 11, the deceleration limit value DTV2MIN is set according to the estimated downhill slope PKU.

In FIG. 9B, there are shown a 6-5 downshift line 50, a 5-4 downshift line 52, a 4-3 downshift line 54, and a 3-2 downshift line 56. As apparent from the comparison between FIGS. 9A and 9B, the downshift lines 50 to 56 in a region where the deceleration is small coincide with the respective downshift lines on the shift map 46 in the case that the throttle angle is small. In FIG. 9B, the line 58 shows a change in DVT2L according to a decrease in vehicle speed V in the case of braking the vehicle on a downhill road. Since DTV is the deceleration taking on negative values in this case, DTV2L also becomes negative. As shown by the line 58, DTV2L increases in the negative direction with a decrease in vehicle speed V. When the line 58 crosses the 6-5 downshift line 50 at a point 60, the transmission is downshifted to the fifth gear position.

DTV2 changes as shown by a curved broken line 58'. However, since DTV2L is limited to the deceleration limit value DTV2MIN, DTV2L becomes flat as shown by a straight solid line 62 corresponding to the curved broken line 58'. Accordingly, when the vehicle speed V is further decreased by the application of the brake force after passing through the point 60, the corrected deceleration DTV2 limited by the limit value DTV2MIN crosses the 5-4 downshift line 52 at a point 64. At this time, the transmission is downshifted to the fourth gear position. When the brake force is removed at the peak of the curved broken line 58', the deceleration DTV is decreased. Accordingly, as shown by the deceleration shift characteristic map 48 in FIG. 9B, the corrected deceleration DTV2L rises in the positive direction (the absolute value of DTV2L is decreased).

Figure 12:
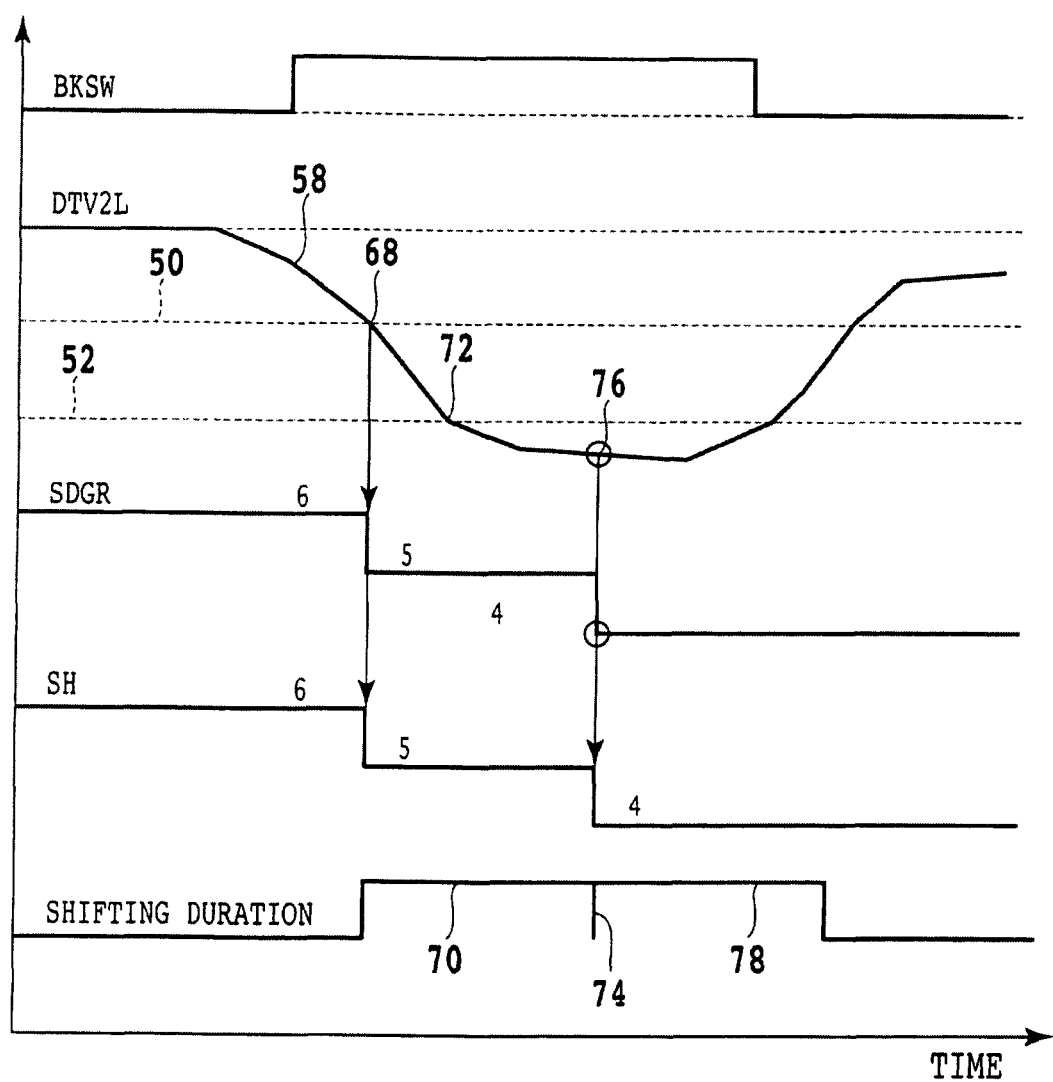
FIG. 12 is a time chart for illustrating the determination of deceleration downshift.
Figure 13:
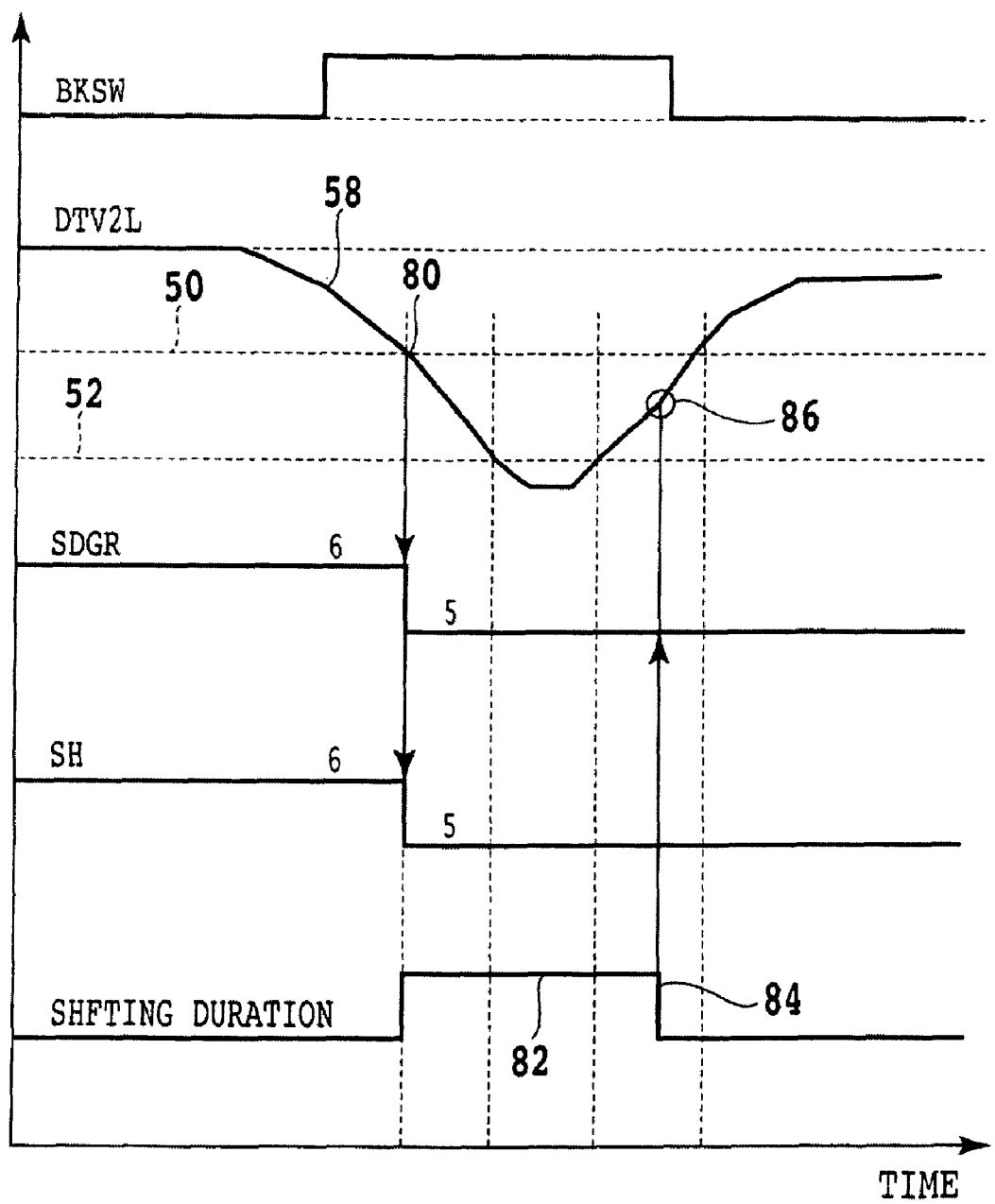
FIG. 13 is a time chart for illustrating the determination of deceleration downshift in the case of rapid deceleration.

In the control according to the present invention, brake downshift is performed stepwise. This will now be described with reference to the time charts shown in FIGS. 12 and 13. In FIGS. 12 and 13, BKSW stands for a brake switch. Further included are the 6-5 downshift line 50, the 5-4 downshift line 52, and the corrected deceleration line 58. When the vehicle is braked on a downhill road, the corrected deceleration DTV2L is increased to cross the 6-5 downshift line 50 at a point 68. At this time, the brake downshift control target gear position SDGR becomes 5, and the present gear position SH also becomes 5. Further, 6-5 downshift is performed during the time period shown by reference numeral 70.

When the corrected deceleration DTV2L is further increased to cross the 5-4 downshift line 52 at a point 72, the target gear position SDGR potentially becomes 4. However, since the 6-5 downshift is being performed during the time period 70, SDGR is maintained at 5 and SH is also maintained at 5. The 6-5 downshift is finished at the time shown by reference numeral 74. At the time 74, the corrected deceleration DTV2L has already become 4 as shown by reference numeral 76, so that SDGR becomes 4 and SH also becomes 4. This 5-4 downshift is performed during the time period shown by reference numeral 78.

Referring to the time chart shown in FIG. 13, the corrected deceleration DTV2L is increased by braking the vehicle on a downhill road to cross the 6-5 downshift line 50 at a point 80. At this time, SDGR and SH both become 5, and the 6-5 downshift is performed during the time period shown by reference numeral 82. During the time period 82 of the 6-5 downshift, the corrected deceleration DTV2L is further increased to cross the 5-4 downshift line 52. However, at the time the 6-5 downshift is finished as shown by reference numeral 84, DTV2L is decreased to maintain the gear position at 5. Thus, 5-4 downshift is not performed in the case of such rapid deceleration. In the present invention, brake downshift is performed stepwise. Further, it is determined whether or not the next downshift is to be performed according to the corrected deceleration DTV2L at the time of finishing of the present downshift. Accordingly, it is possible to reduce delayed downshift occurring after rapid deceleration in a short time.

The cancellation control for brake downshift according to the present invention will now be described with reference to the map shown in FIG. 14. In FIG. 14, the horizontal axis represents deceleration DTV, and the vertical axis represents estimated downhill slope PKU. Reference numeral 96 denotes a line indicating that the accelerator pedal is off (undepressed) and the brake pedal is off (undepressed). Reference numeral 88 denotes a kickup determination DTV threshold DTVKUP. In a region 90 where the acceleration DTV is greater than the kickup determination DTV threshold DTVKUP, kickup is permitted. Reference numeral 92 denotes a downshift canceling and upshift determination DTV threshold DTVCUP. In a region 94 where the deceleration DTV is greater than the downshift canceling and upshift determination DTV threshold DTVCUP, upshift is permitted. In other words, the kickup precondition for permission of kickup is that the accelerator pedal angle AP>0 during a nonshifting period, and the kickup condition for execution of kickup is that DTV>DTVKUP (SH, PKU). By performing the kickup, the transmission is upshifted by one step, i.e., the present gear position SH is increased to SH+1.

The precondition for downshift cancellation and upshift permission is that BKSW=0 and AP=0 during a nonshifting period, and the condition for execution of downshift cancellation and upshift is that DTV<DTVCUP (SH, V). In other words, when the deceleration is large during coasting, brake downshift is canceled and upshift is performed. As the result of this upshift, SH=SH+1. It should be noted that the kickup determination DTV threshold DTVKUP and the downshift canceling and upshift determination DTV threshold DTV-CUP are determined for each gear position.

Figure 15A:
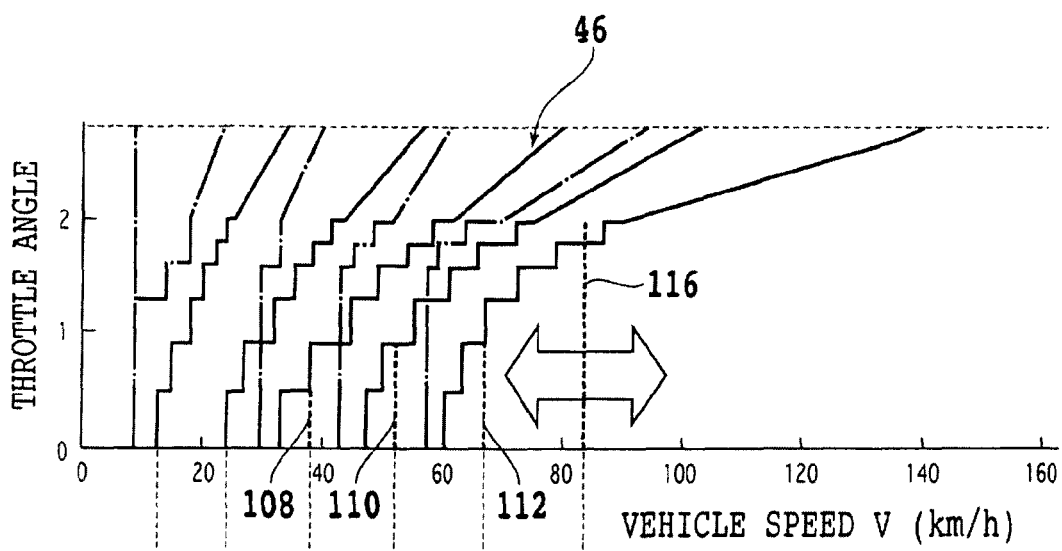
FIGS. 15A and 15B are graphs for illustrating the change of a lowest upshift vehicle speed according to a downhill slope PKU at start and acceleration on a downhill road.
Figure 15B:
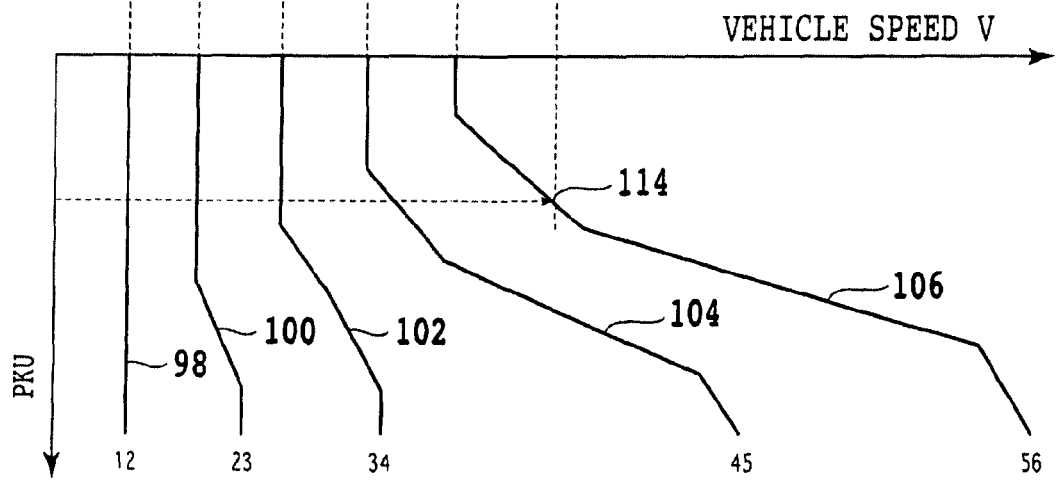

The upshift limit at start and acceleration on a downhill road will now be described with reference to FIGS. 15A and 15B. The term of "start and acceleration" means acceleration from a low vehicle speed, e.g., 10 km/h, with a small throttle angle. FIG. 15A is a shift map for a level road similar to the shift map shown in FIG. 9A, and FIG. 15B is a downhill upshift limit vehicle speed map according to a vehicle speed V and a downhill slope PKU. The map shown in FIG. 15B includes a 1-2 upshift limit vehicle speed line 98, a 2-3 upshift limit vehicle speed line 100, a 3-4 upshift limit vehicle speed line 102, a 4-5 upshift limit vehicle speed line 104, and a 5-6 upshift limit vehicle speed line 106.

At start and acceleration on a downhill road, i.e., at acceleration on a downhill road with a small throttle angle, the 3-4 upshift line is changed as shown by reference numeral 108 in such a manner that a lowest upshift vehicle speed is shifted to a higher vehicle speed. Similarly, the 4-5 upshift line is changed as shown by reference numeral 110 in such a manner that a lowest upshift vehicle speed is shifted to a higher vehicle speed, and the 5-6 upshift line is changed as shown by reference numeral 112 in such a manner that a lowest upshift vehicle speed is shifted to a higher vehicle speed. Further, when the downhill slope PKU is increased to cross the 5-6 upshift limit vehicle speed line 106 at a point 114, the lowest upshift vehicle speed of the 5-6 upshift line is further shifted to a higher vehicle speed as shown by a vertical line 116 vertically extending from the point 114 to the shift map 46. Thus, at start and acceleration on a downhill road, the lowest upshift vehicle speed is shifted to a higher vehicle speed according to the downhill slope PKW, thereby limiting unnecessary upshift.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A control apparatus for an automatic transmission for a vehicle, comprising:
   operational condition detecting means for detecting a vehicle operational condition including at least a vehicle speed and an engine load;
   slope detecting means for detecting a road surface slope;
   shift characteristic selecting means for selecting one of a plurality of shift characteristics preliminarily set according to said road surface slope;
   acceleration/deceleration calculating means for calculating an acceleration or deceleration from the degree of increase or decrease in vehicle speed per unit time;
   a deceleration shift characteristic for deciding a gear position according to said deceleration and said vehicle speed; and
   brake detecting means for detecting a brake operation;
   wherein when said road surface slope is determined to be a downhill slope by said slope detecting means and said brake operation is detected by said brake detecting means, said selected shift characteristic is changed to said deceleration shift characteristic and said gear position is decided according to said deceleration shift characteristic.

2. The control apparatus according to claim 1, further comprising:
   corrected deceleration calculating means for calculating a corrected deceleration by multiplying said calculated deceleration by a correction coefficient which is determined according to said downhill slope;
wherein said gear position is decided according to said corrected deceleration and said vehicle speed by said deceleration shift characteristic.

3. The control apparatus according to claim 2, further comprising:
deceleration limit value setting means for setting a deceleration limit value according to said downhill slope; and
corrected deceleration limiting means for limiting said corrected deceleration to said deceleration limit value when said corrected deceleration becomes greater than said deceleration limit value.

4. The control apparatus according to claim 2, further comprising:
target gear position calculating means for calculating a brake downshift control target gear position according to said vehicle speed and said corrected deceleration; and
downshift end detecting means for detecting the end of a downshift to the brake downshift control target gear position;
wherein a next downshift is determined by comparing said target gear position and the present gear position at the time of ending of the downshift.

5. The control apparatus according to claim 1, further comprising:
a kickup determination acceleration threshold set according to said downhill slope for each gear position;
wherein a kickup of the gear position is permitted when the acceleration becomes greater than said kickup determination acceleration threshold via a depression of an accelerator pedal.

6. The control apparatus according to claim 1, further comprising:
a downshift canceling and upshift determination deceleration threshold set for each gear position;
wherein upshift is permitted when the deceleration becomes greater than said downshift canceling and upshift determination deceleration threshold in a condition where an accelerator pedal is undepressed and a brake pedal is undepressed.

7. The control apparatus according to claim 1, further comprising:
a downhill upshift limit vehicle speed setting according to said downhill slope for each gear position;
wherein a lowest upshift vehicle speed of said selected shift characteristic is changed into said downhill upshift limit vehicle speed at start and acceleration by the depression of an accelerator pedal.

* * * * *